(12) United States Patent
Gale et al.

(10) Patent No.: US 7,556,291 B2
(45) Date of Patent: Jul. 7, 2009

(54) VEHICLE RESTRAINT SYSTEM

(75) Inventors: Steve Gale, Lebanon, IN (US); Chris P. Jessup, Sheridan, IN (US)

(73) Assignee: Indiana Mills & Manufacturing Inc., Westfield, IN (US)

( * ) Notice: Subject to any disclaimer, the term of this patent is extended or adjusted under 35 U.S.C. 154(b) by 505 days.

(21) Appl. No.: 11/334,682

(22) Filed: Jan. 18, 2006

(65) Prior Publication Data

US 2006/0163912 A1     Jul. 27, 2006

Related U.S. Application Data

(60) Provisional application No. 60/647,308, filed on Jan. 26, 2005, provisional application No. 60/720,271, filed on Sep. 23, 2005.

(51) Int. Cl.
*B60R 21/08* (2006.01)
(52) U.S. Cl. .................................. 280/749; 296/190.03
(58) Field of Classification Search ................. 280/748, 280/749, 753, 751; 296/190.03, 152
See application file for complete search history.

(56) References Cited

U.S. PATENT DOCUMENTS

| | | | |
|---|---|---|---|
| 3,782,756 A | | 1/1974 | Brown |
| 5,135,080 A | | 8/1992 | Haston |
| 6,135,497 A | * | 10/2000 | Sutherland et al. .......... 280/749 |
| 6,299,207 B1 | * | 10/2001 | Bares .......................... 280/748 |
| 6,732,829 B2 | * | 5/2004 | Bares .......................... 180/271 |
| 6,752,422 B2 | * | 6/2004 | Sauermann ................. 280/748 |
| 7,125,069 B2 | * | 10/2006 | Cacucci et al. .......... 296/190.03 |
| 7,156,443 B1 | * | 1/2007 | Jung ......................... 296/68.1 |
| 2001/0033073 A1 | * | 10/2001 | Hammond et al. ....... 280/730.2 |
| 2004/0212217 A1 | * | 10/2004 | Cacucci et al. .............. 296/152 |

FOREIGN PATENT DOCUMENTS

| | | |
|---|---|---|
| DE | 19932256 A1 | 7/1999 |
| DE | 10322084 A1 | 12/2004 |
| DE | 10323259 A1 | 12/2004 |
| WO | WO2004045908 A2 | 6/2004 |

OTHER PUBLICATIONS

European Search Report for EP Application No. 06250285.1 dated Jan. 19, 2007 (3 pages).

* cited by examiner

*Primary Examiner*—Ruth Ilan
*Assistant Examiner*—Drew J. Brown
(74) *Attorney, Agent, or Firm*—Barnes & Thornburg LLP

(57) ABSTRACT

A vehicle safety system comprises a gate movably coupled to the vehicle, and a collapsible barrier coupled to the gate and to the vehicle. The gate is movable between a stowed position and a deployed position. In the stowed position, the gate collapses the collapsible barrier into a position adjacent to the vehicle such that the occupant may egress through an exit of the vehicle substantially unimpeded by the collapsible barrier or gate. In the deployed position, the gate and the collapsible barrier extend at least partially across the exit to impede egress of the occupant through the exit.

29 Claims, 6 Drawing Sheets

VEHICLE RESTRAINT SYSTEM

CROSS-REFERENCE TO RELATED U.S. APPLICATIONS

This patent application claims priority to and the benefit of U.S. Provisional Patent Application Ser. No. 60/647,308, filed Jan. 26, 2005, and U.S. Provisional Patent Application Ser. No. 60/720,271, filed Sep. 23, 2005, the disclosures of which are each incorporated herein by reference.

BACKGROUND

The present invention relates generally to vehicle safety systems and more specifically to systems for protecting an occupant of a vehicle.

Various safety systems are used to protect occupants of vehicles. For example, seat belt and airbag systems may be used to protect vehicle occupants. In the case of a lift truck, one suitable seat belt system, for example, might comprise an automatic locking retractor and a belt buckle assembly. Lift trucks may also be equipped with a Falling Object Protection System (FOPS), which comprises a sectioned roof resting on side supports, thereby creating a cab or cockpit in which the occupant is generally protected from falling objects. It has been found that during lift truck tip-over conditions, an occupant may try to exit the cab of the vehicle, or may be ejected from the cab, prior to completion of the tip over. What is desired is a safety system that blocks the exit pathway and contains the occupant substantially within the cab of the lift truck or other vehicle.

SUMMARY

The present invention may comprise one or more of the features recited in the attached claims, and/or one or more of the following features and combinations thereof. A vehicle safety system for impeding the egress of an occupant through an exit of a vehicle may comprise a gate movably coupled to the vehicle, and a collapsible barrier coupled to the gate and to the vehicle. The gate may be movable between a stowed position and a deployed position. In the stowed position, the gate may collapse the collapsible barrier into a position adjacent to the vehicle such that the occupant may egress through the exit substantially unimpeded by the collapsible barrier or gate. In the deployed position, the gate and the collapsible barrier may extend at least partially across the exit to impede egress of the occupant through the exit.

The gate may be an elongate rigid member having a proximal end and a distal end, the proximal end of the rigid member movably coupled to the vehicle. The gate may include a pair of projections extending from the distal end of the gate on opposite sides of the collapsible barrier. The projections may be configured to gather the collapsible barrier for movement to the stowed position.

The collapsible barrier may comprise a net. The collapsible barrier and the gate may be configured to spread the collapsible barrier at least partially across the exit as the gate moves from the stowed position to the deployed position. The collapsible barrier and the gate may be configured to collapse the collapsible barrier and move the collapsible barrier at least partially away from the exit as the gate moves from the deployed position to the stowed position.

The system may further include means for moving the gate to the deployed position during operation of the vehicle.

The system may further include an actuator responsive to a control signal to move the gate to the deployed position. The actuator may include a locking mechanism configured to lock the gate in the deployed position. The system may further include a manual release mechanism configured to unlock the gate when actuated so that the gate may thereafter be manually moved from the deployed position to the stowed position.

The gate may be configured to lock in the deployed position. The system may further include means for manually unlocking the gate so that the gate may thereafter be manually moved from the deployed position to the stowed position.

The system may further comprise a control system configured to control the actuator to move the gate between the stowed and deployed positions. The control system may include a controller configured to produce the control signal based on a signal received from at least one of a switch, a parking brake, a vehicle speed sensor, an accelerometer, and a vehicle attitude sensor. The system may further include a manual release mechanism coupled to the gate and configured to allow free movement of the gate, when manually actuated, to a position other than the position established by the control system.

The system may further include a retractor mounted to the vehicle. The retractor may have one end of an elongated flexible member attached thereto. The opposite end of the elongated flexible member may be attached to the collapsible barrier. The elongated flexible member may retract into the retractor as the gate moves from the deployed position to the stowed position to thereby facilitate collapsing of the collapsible barrier.

The system may further include a flexible member having a first end attached to the gate and a second end attached to the vehicle. The flexible member may be coupled to the collapsible barrier and extend at least partially across the collapsible barrier when the collapsible barrier extends at least partially across the exit.

The system may further comprise a deployable restraint mounted to the vehicle. The deployable restraint may have a stowed position wherein the exit is substantially uncovered by the deployable restraint and a deployed position wherein at least a portion of the exit is covered by the deployable restraint.

The system may further comprise a control system configured to control deployment of the deployable restraint in response to the occurrence of a predefined event. The system may further comprise an actuator in communication with the deployable restraint. The control system may be configured to control the actuator to move the deployable restraint from its stowed position to its deployed position upon the occurrence of the predefined event. The control system may comprise at least one of an accelerometer and a vehicle attitude sensor configured to detect the predefined event.

The deployable restraint may comprise an inflatable restraint. The inflatable restraint may comprise an inflatable tube. In one alternative embodiment, the inflatable restraint may comprise an inflatable curtain. In another alternative embodiment, the inflatable restraint may comprise an inflatable curtain and tube combination. In yet another alternative embodiment, the inflatable restraint may comprise an inflatable bladder.

The system may further comprise a housing adapted to contain the inflatable restraint in its stowed position. The housing may be coupled to the gate. Alternatively, the housing may comprise the gate.

The inflatable restraint in its deployed position may be inclined toward the collapsible barrier and away from the occupant of the vehicle.

In an alternative embodiment, the deployable restraint may comprise a non-inflatable member. The non-inflatable member may be resettable from its deployed position to its stowed position.

A vehicle safety system may comprise a vehicle exit bounded by at least one top member coupled to at least two spaced apart side members, a gate and a collapsible barrier. The at least two side members may be mounted to the vehicle. The gate may be movably coupled to one of the at least two side members. The collapsible barrier may be coupled to the gate and to the vehicle exit. The gate may be movable between a stowed position with the gate collapsing the collapsible barrier into a position adjacent to the one of the at least two side members, and a deployed position with the gate and the collapsible barrier extending at least partially across the exit.

The system may further include an actuator mounted to the one of the at least two side members. The actuator may be responsive to a control signal to move the gate between the stowed and deployed positions.

The collapsible barrier may define a first edge coupled to the gate. The collapsible barrier may define a second edge coupled to the at least one top member. The collapsible barrier may define a third edge coupled to the one of the at least two side members.

The collapsible barrier may comprise a net.

DESCRIPTION OF THE ILLUSTRATIVE EMBODIMENTS

Figure 1A:
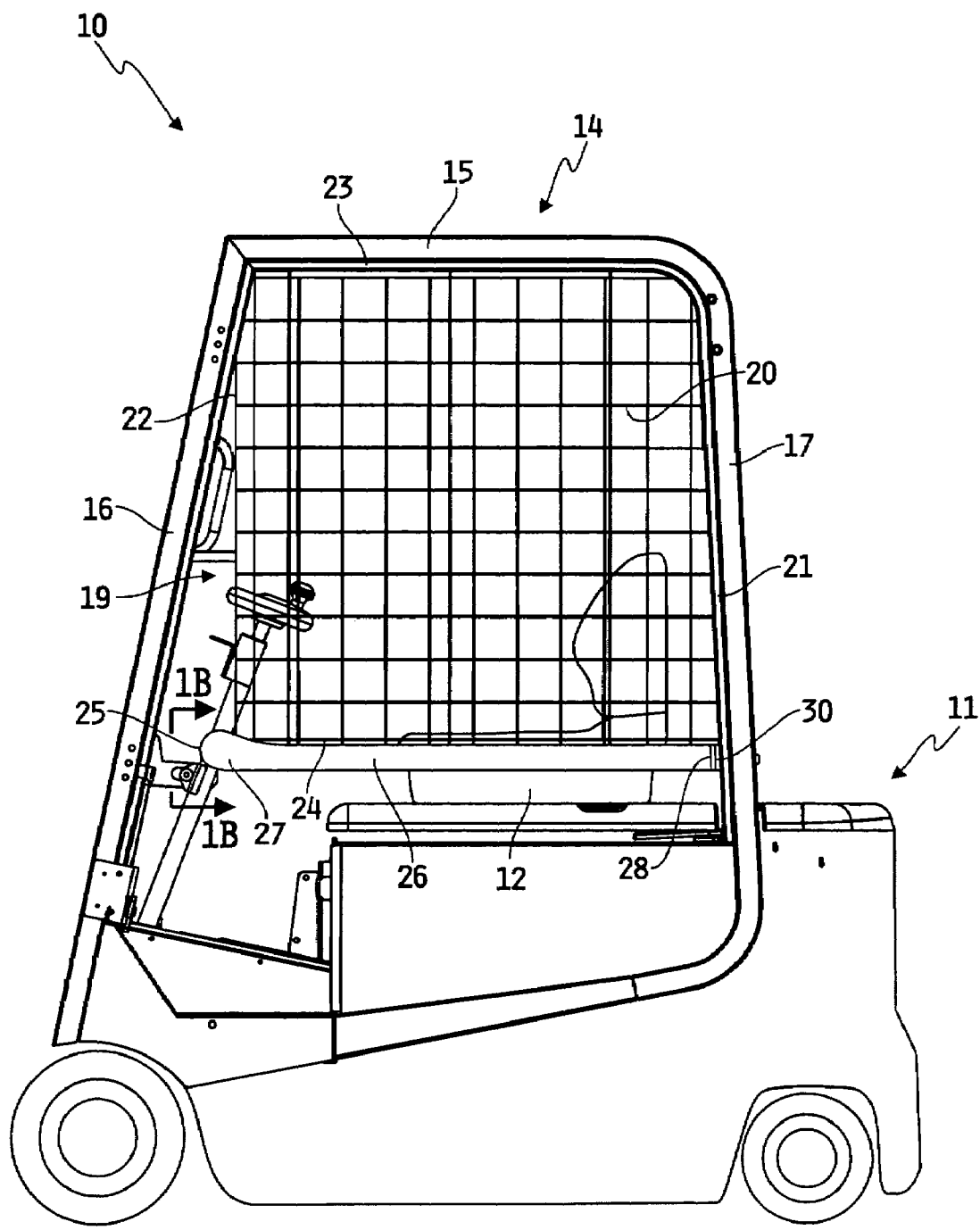
FIG. 1A illustrates a side view of an exemplary vehicle equipped with an illustrative embodiment of a vehicle safety system in a deployed position.

For the purposes of promoting an understanding of the principles of the invention, reference will now be made to one or more illustrative embodiments illustrated in the drawings and specific language will be used to describe the same.

FIG. 1A depicts an illustrative embodiment of a vehicle safety system 10 which includes a safety barrier 19 comprising a collapsible barrier 20 and a gate 26. The collapsible barrier may generally be formed of any convention flexible material, or of any conventional rigid or semi-rigid yet collapsible material. In the illustrated embodiment, for example, the collapsible barrier 20 is a net formed of a suitable fabric, which may be generally rectangular in shape. In this embodiment, the collapsible barrier 20 may be any suitable commercially available netting made of any suitable material such as for example without limitation nylon, rope, webbing, fabric and the like, and may be knotted at each junction or woven together rather than knotted. One suitable net is, for example and without limitation, a Carron net. Alternatively, the collapsible barrier 20 may be any other flexible material, rigid yet collapsible material or semi-rigid yet collapsible material. In any case, it is desirable to select a suitable material for the collapsible barrier 20 that performs in a manner to be described hereinafter, and that is also at least partially see-through to allow vision through the barrier 20.

The collapsible barrier 20 is coupled to the gate 26. The collapsible barrier 20 and the gate 26 are mounted to a vehicle 11, for example to a falling object protection system (FOPS) 14 of a vehicle 11, for example a lift truck. The FOPS 14 typically comprises a pair of substantially vertically aligned spaced-apart front supports 16, a pair of substantially vertically aligned spaced-apart back supports 17 and a pair of substantially horizontally aligned spaced-apart top members 15 coupled between the side supports 16, 17. The FOPS 14 forms a cab around an occupant seat 12 and also defines an exit 13 (FIG. 2) on one or both sides of the vehicle 11. As shown in FIG. 1A, the safety barrier 19 is attached to the left side of the vehicle 11. It will be appreciated that the safety barrier 19 may alternatively be attached to the right side of the vehicle 11, or the vehicle safety system 10 may comprise two or more safety barriers 19, for example one safety barrier 19 located on each side of the vehicle 11.

Figure 1B:
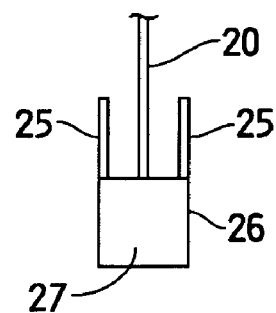
FIG. 1B illustrates an end view of the gate of the vehicle safety system of FIG. 1A.
Figure 3:
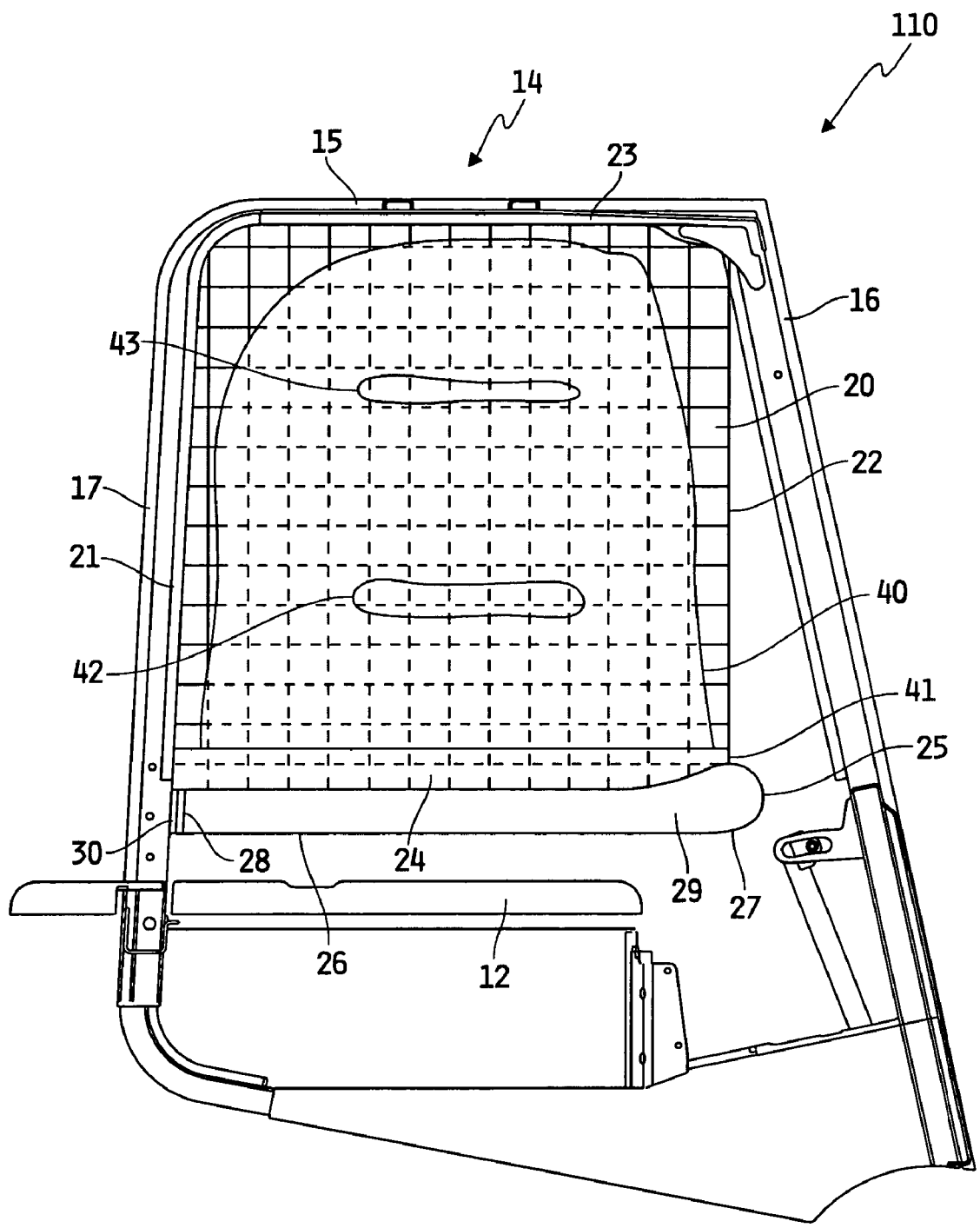
FIG. 3 shows a partial side view of the vehicle safety system of FIGS. 1A-2, as viewed through the cab area of the vehicle, wherein the vehicle safety system includes a deployable inflatable restraint.

In the illustrated embodiment, a proximal end 28 of the gate 26 is mounted to the vehicle 11 generally adjacent to a lower portion of the occupant seat 12, and a distal end 27 of the gate 26 extends away from the one end 28 generally across the exit 13. For example, the proximal end 28 of the gate 26 may be hingedly or otherwise pivotably attached to the back support 17 as shown in FIG. 1A. The gate 26 is an elongate rigid member, for example a hollow, semi-hollow or solid tube having any desired cross-sectional shape, e.g., rectangular. As shown in FIGS. 1A and 1B, the gate 26 may also include a pair of projections 25 extending substantially, vertically above the upper surface of the distal end 27 of the gate 26, the purpose of which will be described below. The projections 25 may be alternatively splayed outwardly to widen the cavity formed by projections 25 and the upper surface of gate 26. The projections 25 may be curvilinear as shown in FIG. 3 and may be integral with or coupled to the gate 26. The gate 26 may be made from any suitable metallic, non-metallic, or composite material such as for example and without limitation steel, aluminum, zinc, plastic, resin, and the like using any method of manufacture suitable to the material being used.

The collapsible barrier 20 spans between the gate 26 and a portion of the vehicle 10, for example a portion of the FOPS 14. A bottom edge 24 of the collapsible barrier 20 may be attached along the length of the gate 26 between the proximal end 28 and the distal end 27 of the gate 26. A top edge 23 of the collapsible barrier 20 may be attached to one of the top members 15. A rear edge 21 of the collapsible barrier 20 may be attached to one of the back supports 17. A front edge 22 of the collapsible barrier 20 may be attached to at least a portion of one of the front supports 16. The attachment between the collapsible barrier 20 and the gate 26, top member 15, and supports 16 and 17 may be by any suitable fastening means, such as for example grommets and fasteners, nuts and bolts, tacks, screws, cement, ties, webbing, loops and hooks, rivets and the like.

Figure 2:
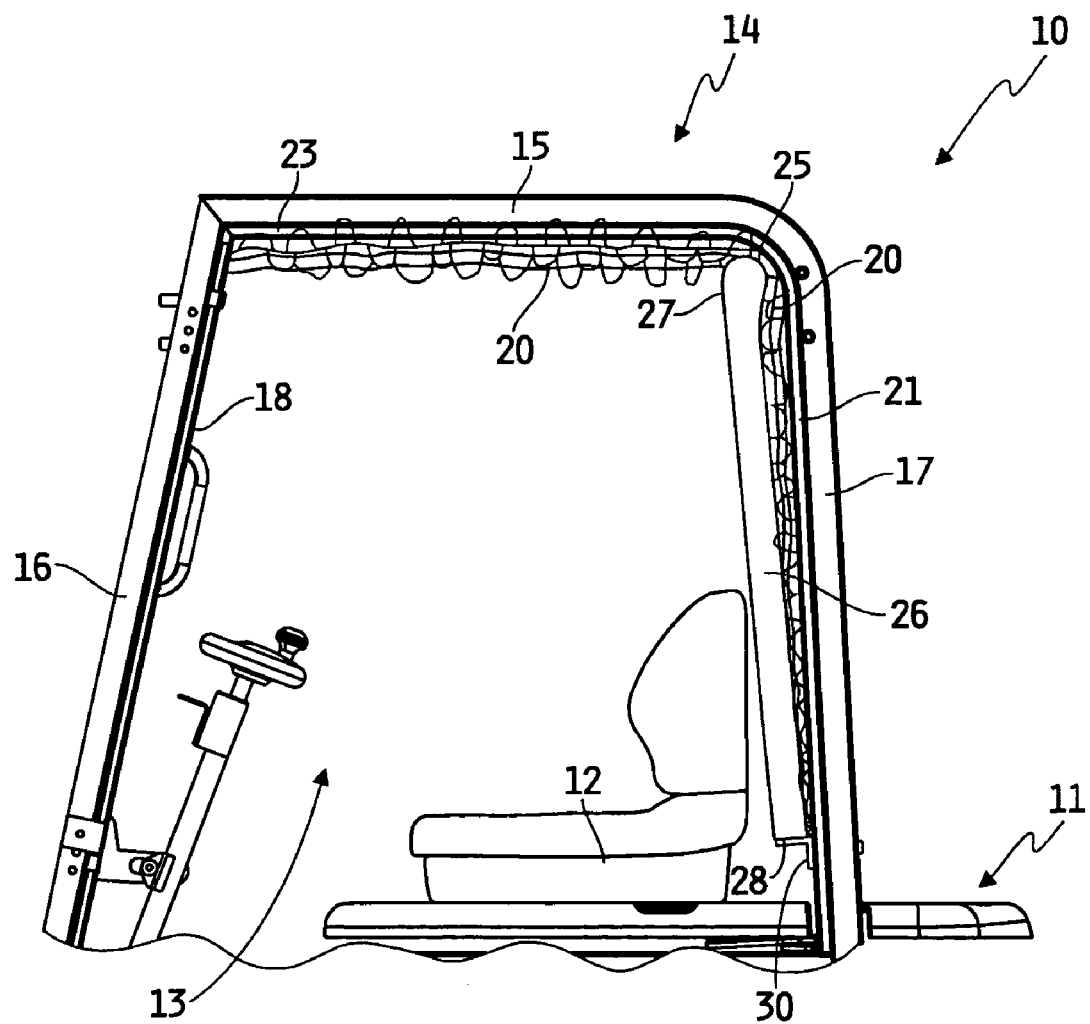
FIG. 2 illustrates a partial side view of the vehicle safety system of FIG. 1A shown in a stowed position.

The gate 26 is actuatable between a deployed or extended position as illustrated in FIG. 1A and a stowed or retracted position as illustrated in FIG. 2. In the deployed position, the gate 26 extends substantially horizontally from the back support 17 toward the front support 16. In the retracted position, the gate 26 extends upwardly and substantially follows the contour established by the back support 17 as shown in FIG. 2.

The attachment of the collapsible barrier 20 between the gate 26 and the FOPS 14 enables the movement of the gate 26 between the deployed and stowed positions to gather and collapse the collapsible barrier 20, and enables movement of the gate 26 between the stowed and deployed positions to release and extend or spread the collapsible barrier 20 across the exit 13, as illustrated in FIG. 2 and FIG. 1A, respectively.

As the gate 26 is moved from its deployed position to its stowed position, the projections 25 of the gate 26 gather the front edge 22 of the collapsible barrier 20, and the front edge 22 and the bottom edge 24 of the collapsible barrier 20 are then raised upwardly and rearwardly such that the front edge 22 is disposed proximate to the top side 23 of the collapsible barrier 20, and the top member 15, and the bottom edge 24 is disposed proximate the back edge 21 of the collapsible barrier 20 and the back support 17. This action substantially clears the exit 13 of both the gate 26 and the collapsible barrier 20 so that an occupant may exit or egress the vehicle substantially unimpeded by the safety barrier 19.

As the gate 26 is moved from its stowed position to its deployed position, the collapsible barrier 20 extends or spreads downwardly and forwardly so that the bottom edge 24 of the collapsible barrier 20 extends substantially horizontally from the back support 17 and the front edge 22 of the collapsible barrier 20 extends substantially vertically down from the top member 15 as illustrated in FIG. 1A. In this position, the collapsible barrier 20 extends across or spans at least a portion of the vehicle exit 13 in order to impede the occupant from exiting the vehicle through that exit. The projections 25 at the distal end 27 of gate 26 not only serve to gather or collect the collapsible barrier 20 during stowage of gate 26, but also to prevent the collapsible barrier 20 from becoming tangled around the distal end 27 of the gate 26. As used herein, egress and exit mean the act of the occupant coming out of, or leaving, the vehicle 11, either voluntarily under the occupant's own power, or involuntarily as a result of the occurrence of some event such as, for example, when the vehicle tips over, impacts an object or the like and the occupant falls from or is ejected from the vehicle.

In one illustrative embodiment, the attachment of the gate 26 to the vehicle may be configured such that the occupant of the vehicle 11 may physically move the gate 26 between its stowed and deployed positions. In this embodiment, the gate 26 and/or vehicle 11 may additionally be configured to allow the occupant to manually lock the gate 26 in the deployed position, using any suitable locking means such as by engaging a hook on the gate 26 or collapsible barrier 20 with an eye anchored on the vehicle, or engaging a latch or any other suitable locking mechanism. Alternatively, the gate 26 and the collapsible barrier 20 may also be locked through automatic means.

In another illustrative embodiment, the gate 26 and the collapsible barrier 20 may be automatically or manually deployed, retracted and/or locked through any combination of electrical, mechanical or electromechanical devices. For example, referring to FIG. 2, the safety system 10 may further comprise a deployment actuator 30. The deployment actuator 30 may be, for example, a hinge or other moveable link, or an electromechanical device including, for example, a hinge and a hinge actuator. The deployment actuator 30 may be mounted between the back support 17 and the proximal end 28 of the gate 26, mounted adjacent the back support 17 and the proximal end 28, located internal to one or both of the back support 17 and the proximal end 28 of the gate 26, or any combination thereof. The deployment actuator 30 may drive the gate 26 between the stowed and the deployed positions, and may further lock the gate 26 in either or both of the stowed and the deployed positions.

It is generally desirable for the safety barrier 19 described herein, including the gate 26 and the collapsible barrier 20, to be deployed downwardly to a position generally at or below the seat 12 such that the distance between the bottom edge 24 of the collapsible barrier 20 and the sitting surface of the seat is minimized to better impede occupant egress or ejection from the cab. During certain defined conditions, such as a tip-over condition, it is desirable, though not necessary, that the gate 26 and the collapsible barrier 20 not only be in the deployed position, to some degree or another, but also in the locked condition, which may be accomplished through control devices as will be described below.

In operation, the gate 26 and the collapsible barrier 20 are deployed as described above and at any suitable or desired time. For example, the gate 26 may be deployed after the occupant mounts the vehicle 11, and may thereafter be locked in the desired deployed position at the desired time, using any suitable mechanical lock or any suitable electrical or electromechanical locks known to those skilled in the art. For example, a pawl lock, a pin and slot or hole combination, a friction lock, a sprag lock, or a cam lock. The occupant may alternatively mount the vehicle and manually pull the gate 26 into the deployed position and then lock the gate as described above. Either one or a combination of manual and control system actuation may also be used to deploy and/or lock the gate 26. During the operation of the vehicle, the deployed position of the gate 26 and the collapsible barrier 20 provides generally continuous and collapsible containment of the occupant generally within the confines of the cab as generally defined by the FOPS 14 and the collapsible barrier 20. In other words, the occupant is impeded from either falling out of the cab or jumping out of the cab or otherwise egressing the vehicle 11 when the gate 26 is locked in the deployed position, and possibly also when in the deployed but unlocked position. The gate 26 need not be fully deployed, nor even locked to inhibit occupant egress.

It will be appreciated that while the gate 26 is deployed, whether fully deployed or not, the occupant still has visibility through the collapsible barrier 20, thus allowing for continuous and collapsible deployment during the normal operation of the vehicle. The collapsible barrier 20 may be configured to provide visibility in accordance with any applicable local, state, or federal safety regulations and/or laws. A portion of the collapsible barrier 20 may even be cut out to provide a window of desired shape and size. Such a window, for example, may be devoid of structure or may be equipped with for example a piece of clear material, such as plastic. The collapsible barrier 20 may even be a solid but transparent barrier, such as for example a sheet of plastic.

As just described, the gate 26 may be manually deployed and/or locked by a person physically moving it to the deployed position and actuating any suitable locking means, or by a person actuating, activating or deactivating, for example and without limitation a switch or mechanical or electro-mechanical devices such as the deployment actuator 30. The collapsible barrier also may be deployed and/or locked automatically. For example, the deployment actuator 30 may be biased to deploy the gate 26 automatically. In which case, the occupant could apply pressure to the gate 26 to overcome the bias and enter the vehicle 11. The gate 26 would then return to the deployed position after the occupant eased the pressure.

Figure 4:
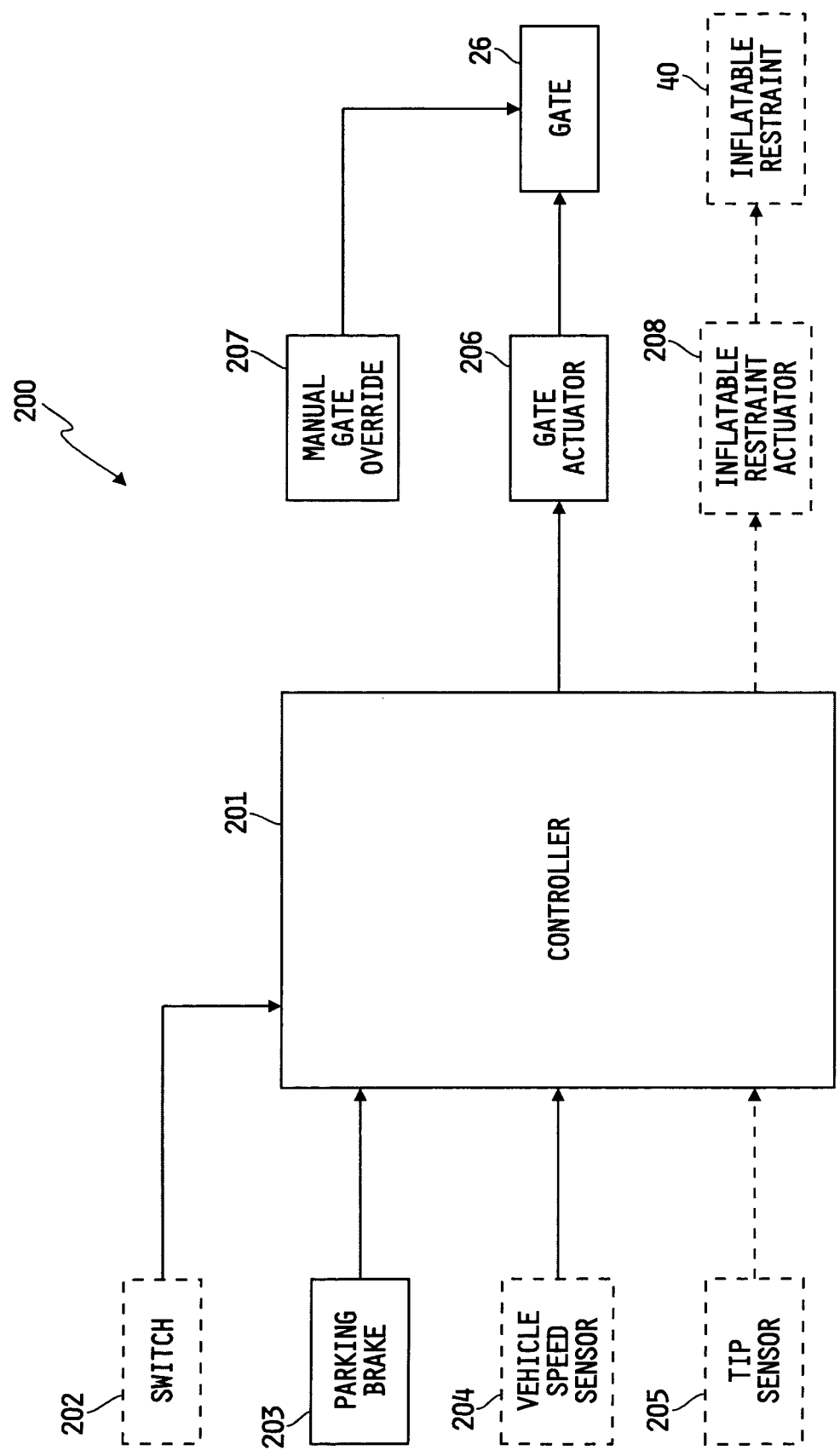
FIG. 4 illustrates an illustrative embodiment of a control system associated with the vehicle safety system of FIGS. 1A-3.

In another illustrative embodiment, the safety system 10 may further comprise a control system 200, illustrated in FIG. 4, which automatically may deploy, stow and/or lock the gate 26 and the collapsible barrier 20 as a function of one or more conditions. Illustratively, such a control system automatically may deploy the gate 26 at the occurrence of one or a combination of defined events or triggers, for example and without limitation: when power is applied to the vehicle 11, when an occupant activates a cab-mounted switch 202, when an occupant sits on the seat 12 thereby activating a sensor (not shown), when an occupant engages a seat belt and buckle (not shown), when a parking brake 203 is released, when the vehicle 11 is put into gear, when the accelerator is depressed, when the control system 130 senses vehicle acceleration exceeding a preset threshold, when the vehicle exceeds a preset speed sensed by a vehicle speed sensor 204, when the attitude of the vehicle 11 exceeds a preset threshold sensed by a tip sensor 205, or when some other trigger alone or in combination with one of the above occurs.

The control system may also lock the gate 26 in the deployed position at the occurrence of one of the above triggers, alone or in combination, or the occurrence of some other suitable trigger(s), such as for example when the control system senses a tip-over condition. For example, it may be desirable for the gate 26 to be deployed and locked whenever the vehicle is moving, for example when the parking brake is disengaged; or it may be desirable for the gate 26 to be deployed and unlocked during normal operation, thereafter locking only upon the occurrence of some defined event, such as for example a tip-over condition or when the vehicle exceeds a certain speed or incline. In such a locked condition, for example, the controller 201 may lock the gate actuator 206 or other locking device, thereby preventing the occupant or any other force from raising the gate 26 from the deployed position. At the occurrence of yet further defined event(s) or trigger(s), alone or in combination, the controller 201 may then unlock and/or stow the gate 26, as programmed. For example, the controller 201 may unlock the gate 26 only when certain accelerations are no longer sensed, or no longer sensed after a defined period of time, all as defined by the logic in the controller 201, and may stow the gate 26 when the switch 202 is activated, or when the control system 200 no longer senses any acceleration and/or the parking brake sensor 203 indicates the parking brake is engaged.

Thus, the control system 200 may receive and process input signals from any number of sensors, and may output control signals to any number of devices that move or lock the gate 26 and the collapsible barrier 20. For example, sensors may include one or more of a switch 202, a parking brake sensor 203, a vehicle speed sensor 204, and a tip sensor 205. Devices receiving an output signal may include, for example, a gate actuator 206 and an inflatable restraint actuator 208, described below.

The tip sensor 205 coupled to the controller 201 may sense any number of parameters or the occurrence of any defined event to include, for example and without limitation, tip-over conditions, accelerations, inclines, velocities and the like. The control system 200 may also comprise other sensors to determine the status of the system 10, for example and without limitation, a sensor may determine whether the locking device, the gate, the barrier, the deployment actuator, the inflator, and the like are in proper working order. Examples of suitable control systems 200 and sensors are described in commonly owned U.S. Pat. No. 6,212,455 to Weaver (the "'455 patent") and U.S. Pat. No. 6,600,985 to Weaver et al. (the "'985 patent"), the disclosures of which are incorporated herein by reference. It will be appreciated that other conventional control systems and sensors also may be used.

The sensors 200, 203, 204, 205 may monitor the occurrence of such defined events and/or such parameters as the acceleration of the vehicle 11 and/or the attitude angle and rate of the vehicle relative to the horizontal plane or other defined reference, by inference, for example by parking brake sensor 203 indicating the parking brake has been released, or by directly sensing the event or parameter. When any one, or combination of measured parameters and/or defined events exceed a certain defined or threshold value, which may be tailored to a particular vehicle and circumstance, the controller 200 can send a signal to the gate actuator 206, for example, in the safety system 10 to deploy and or lock the gate 26 in the deployed position. The system 10 may stay in a deployed and/or locked state for a defined time, and may return to a stowed and/or unlocked state on command, for example after a defined time, after activation of a switch, or after cycling power. Similarly, the controller 201 may direct the gate 26 to be deployed or stowed based on the meeting of some criteria or trigger as discussed herein.

In order to provide a means of bypassing the control of the gate 26 by the controller 201, a manual gate override 207 may be provided. The override 207 may be in the form of a mechanical or an electro-mechanical device for overriding the input signal provided to the gate actuator 206 in order to lock, unlock, or position the gate 26 in a state other than that commanded by the controller 201. For example, the controller 201 may be programmed to remain in the deployed and lock state after sensing of a predefined event until, for example, a power down state. By operating the manual gate override 207, the operator or other person may release the gate 26 from the deployed position to exit vehicle 11 after it is determined that the operator can safely exit vehicle 11. The manual gate override 207 may be, for example, a releasable mechanical coupling capable of disengaging the gate 26 from the gate actuator 206.

With respect to safety system 110 described herein below, the control system 200 will operate in substantially the same manner as just described although in addition to or in lieu of locking the gate 26 and collapsible barrier 20, the controller 201 may send control signals to an inflatable restraint actuator 208 upon sensing a tip-over or other condition in order to inject fluid into and thereby deploy the respective inflatable restraint 40, or any combination of the gate 26, collapsible barrier 20, and/or inflatable restraint 40 as will now be described in more detail.

In lieu of, or in combination with the gate 26 and the collapsible safety barrier 20, the vehicle safety system 110 may include an inflatable restraint device 40 that is deployable to impede or even prevent occupant egress. FIG. 3 illustrates an illustrative embodiment of such a vehicle safety system 110 that includes the gate 26 and collapsible barrier 20 as described hereinabove, and that further includes an inflatable restraint device that includes one or more inflatable restraints 40. Although illustrated in FIG. 3 as a single inflatable bladder, the one or more inflatable restraints 40 may alternatively or additionally be provided in the form one or more inflatable bladders, tubes, or curtains. When the inflatable restraint 40 inflates, as will be described below, the restraint 40 is guided by the housing 41 and the collapsible barrier 20 to a deployed position adjacent to the collapsible barrier 20 as shown in FIG. 3. The inflatable restraint 40 may also include bladder shaping zones 42 and 43 for further guiding and shaping the restraint 40.

The housing 41 associated with the inflatable restraint 40 may be mounted to the gate 26, for example, on the inside surface 29 of the gate 26 (toward the occupant) or on the top surface of the gate 26. Alternatively, the housing 41 may be mounted to another part of the vehicle 11, for example, a portion of FOPS 14. The housing 41 maybe attached by any suitable means such as, for example, by adhesive, cement, rivets, tacking, screws, nuts and bolts, and the like. Alternatively still, the housing 41 may form the gate 26 and thereby perform the dual functions of acting as the gate 26 as described herein, and also acting as a housing for the inflatable restraint 40. One embodiment of such a housing 41 and inflatable restraint 40 combination is disclosed in commonly owned U.S. patent application Ser. No. 10/914,513, entitled "Modular Inflatable Restraint System", the disclosure of which is incorporated herein by reference, In normal operation, the inflatable restraint 40 is in the fully retracted and stowed position within the housing 41. The housing 41 may include a cover configured to open during deployment of the inflatable restraint 40 to the deployed position shown in FIG. 3. Such a cover may be configured to direct the inflatable restraint 40 upwardly and toward the collapsible barrier 20 (away from the occupant) upon deployment. One example of such a cover is described in co-pending U.S. patent application Ser. No. 10/914,513, the disclosure of which has been incorporated herein by reference. In the case of the system 110 including a collapsible barrier 20 as illustrated in FIG. 3, the collapsible barrier 20 guides the inflatable restraint 40 to a deployed position between the occupant and the collapsible barrier 20. Alternatively, the collapsible barrier 20 may be located between the occupant and the inflatable restraint 40, the collapsible barrier 20 acting to ensure the occupant is in the proper position for deployment of the inflatable restraint 40.

The safety system 110 may further comprise the above described control system 200, which operates substantially as described above in conjunction with the safety system 10, and as will now be expanded upon in conjunction with the inflatable restraint 40. In operation, the tip sensor 205 and/or the vehicle speed sensor 204, or other sensors as described above for the control system 200, sense one or more parameters to determine if the vehicle 11 has reached a defined state or condition, such as roll or tip-over condition in the manner described above by comparing values, for example vehicle attitude angle and rate to threshold values tailorable to specific vehicles and situations, and as for example described in the '455 patent. Upon the controller 201 determining such a defined state or condition from the received signals, the controller 201 sends a signal to inflatable restraint actuator 208 in order to inflate the inflatable restraint 40. Examples of suitable inflation devices are disclosed in U.S. Pat. No. 5,322,322 to Bark et al., and in U.S. Pat. No. 5,480,181 also to Bark et al., each of the disclosures of which are now incorporated herein by reference, and in the '513 application. Other conventional inflation devices may be used as well. A signal may be sent to an output warning device as well.

When the inflatable restraint 40 is in the stowed position, the bladder is substantially devoid of fluid so that the exit 13 of the vehicle 11 is substantially uncovered by the inflatable restraint 40, thereby allowing an occupant to enter or egress through the exit 13 substantially unimpeded by the inflatable restraint 40. In contrast, the act of inflation substantially fills the bladder with fluid, thereby deploying the inflatable restraint 40. After inflation and deployment of the inflatable restraint 40 to the deployed position, at least a portion of the exit 13 of the vehicle is covered in order to provide an impact cushion. Deployment of the inflatable restraint 40 also acts to impede the occupant's egress through the exit 13. In the case of the safety system 110 including a collapsible barrier 20, the collapsible barrier 20 provides a reaction surface to guide the inflatable restraint 40. The inflatable restraint 40 inflates rapidly and may be, for example, unvented, allowing it to remain inflated long enough to contain the occupant within the cab as defined by the FOPS 14 and the deployed collapsible barrier 20 and inflatable restraint 40. The inflatable restraint 40 may also cushion the occupant. Illustratively, the inflatable restraint 40 may inflate in about 100 msec and may remain inflated for about 10 seconds.

It will be appreciated that the inflatable restraint 40 may be deployed laterally between the supports 16, 17 or upwardly from the bottom of the vehicle 11, and mounted accordingly. It will further be appreciated that in addition to the configurations described above, either one of the safety systems 10 and 110 may be configured for implementation in a number of different types of vehicles other than the illustrative lift truck vehicle 11.

In addition to the examples described above, the following examples are illustrative but not exclusive. Any given vehicle 11 may have one or more collapsible barriers 20 on one or on each side of the vehicle. Any given vehicle 11 may have one or more collapsible barrier(s) 20 on one side in combination with one or more inflatable restraint(s) 40 on that same side. Any given vehicle 11 may have a collapsible barrier(s) 20 on one side and one or more inflatable restraint 40 on the other side of the vehicle 11. Any given vehicle may have both (1) a collapsible barrier or barriers 20 in combination with one or more inflatable restraint 40 on one side, and (2) one or more inflatable restraint 40 on the other side of the vehicle 11. Any given vehicle may have both (1) a collapsible barrier 20 in combination with an inflatable restraint 40, and (2) another collapsible barrier 20 in combination with one or more inflatable restraint(s) 40 on the other side of the vehicle 11.

Figure 5:
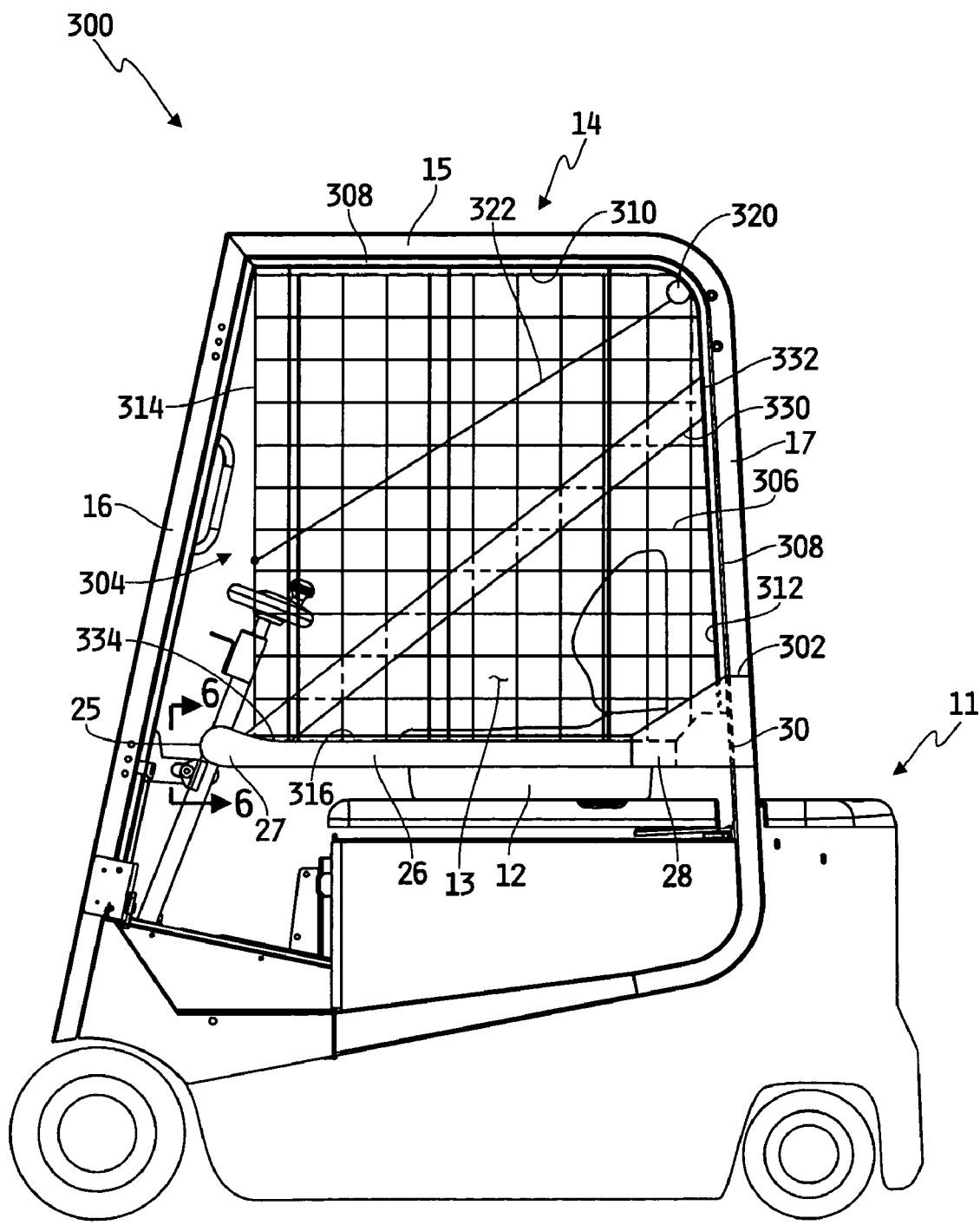
FIG. 5 illustrates a side view of an exemplary vehicle equipped with another illustrative embodiment of a vehicle safety system in a deployed position.

Referring now to FIG. 5, another illustrative embodiment of a vehicle safety system 300 is shown. The vehicle safety system 300 is identical in some respects to the vehicle safety system 10 illustrated and described herein, and like numbers are therefore used to identify like components. Generally, the vehicle safety system 300 includes a safety barrier 304 comprising a collapsible barrier 306 and a gate 26. The collapsible barrier 306 may generally be formed of any conventional flexible material, or of any conventional rigid or semi-rigid yet collapsible material. In the illustrated embodiment, for example, the collapsible barrier 306 is a net formed of a suitable fabric, which may be generally rectangular in shape. In this embodiment, the collapsible barrier 306 may be any suitable commercially available netting made of any suitable material such as for example without limitation nylon, rope, webbing, fabric and the like, and may be knotted at each junction or woven together rather than knotted. One suitable net is, for example and without limitation, a Carron net. Alternatively, the collapsible barrier 306 may be any other flexible material, rigid yet collapsible material or semi-rigid yet collapsible material. In any case, it is desirable to select a suitable material for the collapsible barrier 306 that performs in a manner to be described hereinafter, and that is also at least partially see-through to allow vision through the barrier 306.

The collapsible barrier 306 is coupled to the gate 26, and the combination of the collapsible barrier 306 and the gate 26 is mounted to a vehicle 11, for example to a falling object protection system (FOPS) 14 of a vehicle 11, for example a lift truck. The FOPS 14 typically comprises a pair of substantially vertically aligned spaced-apart front supports 16, a pair of substantially vertically aligned spaced-apart back supports 17 and a pair of substantially horizontally aligned spaced-apart top members 15 coupled between the side supports 16, 17. The FOPS 14 forms a cab around an occupant seat 12 and also defines an exit 13 on one or both sides of the vehicle 11. As shown in FIG. 5, the safety barrier 304 is attached to the left side of the vehicle 11. It will be appreciated that the safety barrier 304 may alternatively be attached to the right side of the vehicle 11, or the vehicle safety system 300 may comprise two or more safety barriers 304, for example one safety barrier 304 located on each side of the vehicle 11.

In the illustrated embodiment, a proximal end 28 of the gate 26 is coupled to an actuator 30 that is attached to the vehicle, e.g., to the back support 17. A bracket 302 is mounted to the vehicle, e.g., to the back support 17, and surrounds the actuator 30 and the proximal end 28 of the gate 26. Specifically, the bracket 302 in one exemplary embodiment comprises a bottom plate having a pair of upstanding sidewalls extending therefrom to form a "U" or "C" shaped channel. The bottom of the channel supports, at least in part, the actuator 30 and the proximal end 28 of the gate 26. The bracket 302 may be formed of a suitable metal composite, a rigid plastic compound, or the like. Alternatively, the bracket 302 and actuator 30 may be mounted to the vehicle 11 adjacent to the seat 12, e.g., to the seat base or frame. In any case, the actuator 30 is illustratively a conventional electromechanical actuator that is responsive to a control signal to move the gate 26 between its stowed and deployed positions as described hereinabove.

The distal end 27 of the gate 26 extends away from the proximal end 28 generally across the exit 13. In the embodiment illustrated in FIG. 6, the gate 26 includes a pair of projections 25 extending substantially vertically above the upper surface, and beyond the end surface, of the distal end 27 of the gate 26.

A barrier mounting frame 308 is generally formed in the shape defined by the combination of the top member 15 and one of the back supports 17, as illustrated in FIG. 5, and is configured to be attached to the top member 15 and back support 17 via a number of conventional attachment members. Top and rear edges 310 and 312 respectively of the collapsible barrier 306 are attached along their lengths to the barrier mounting frame 308 in a conventional manner. The bottom edge 316 of the collapsible barrier 306 is likewise attached along its length to the gate 26 between the proximal end 28 and the distal end 27 thereof, and a front edge 314 of the collapsible barrier 306 extends between the top edge 310 and the bottom edge 316.

A conventional retractor 320 is mounted to the vehicle 11 via the barrier mounting frame 308. The retractor 320 includes an elongated flexible member 322 having one end attached to the retractor 320 and an opposite end attached the front edge 314 of the collapsible barrier 306. The retractor 322 is configured to normally have the elongated flexible member 322 retracted therein, so that when the opposite end of the elongated flexible member 322 is attached to the collapsible barrier 306 as illustrated, the elongated flexible member 322 applies a biasing force generally parallel to the elongated flexible member 322 and in the direction toward the retractor 320. In the illustrated embodiment, the opposite end of the elongated flexible member 322 is attached to the front edge 314 of the collapsible barrier 306 at approximately ⅓-½ of the distance from the distal end 37 of the gate 26 to the top member 15 when the gate 26 and collapsible barrier 306 are in their deployed positions. Alternatively, the opposite end of the elongated flexible member 322 may be attached to the front edge 314 of the collapsible barrier 306 at other locations along its length, or may instead be attached to the collapsible barrier 306 at any desired location in-board from the front edge 314, as long as the combination retractor 320 and elongated flexible member 322 adequately perform the function to be described hereinafter. In any case, the elongated flexible member 322, in one exemplary embodiment, is a fabric string, although the elongated flexible member may alternatively be a web, tether or other flexible member.

As described hereinabove, the gate 26 is actuatable between a deployed or extended position as illustrated in FIG. 1A and in FIG. 5, and a stowed or retracted position as illustrated in FIG. 2. In the deployed position, the gate 26 extends substantially horizontally from the back support 17 toward the front support 16. In the retracted position, the gate 26 extends upwardly and substantially follows the contour established by the back support 17 as shown in FIG. 2. The attachment of the collapsible barrier 306 between the gate 26 and the FOPS 14 enables the movement of the gate 26 between the deployed and stowed positions to gather and collapse the collapsible barrier 306, and enables movement of the gate 26 between the stowed and deployed positions to release and extend or spread the collapsible barrier 306 across the exit 13. This action substantially clears the exit 13 of both the gate 26 and the collapsible barrier 306 so that an occupant may exit or egress the vehicle substantially unimpeded by the safety barrier 304.

As the gate 26 is moved from its deployed position to its stowed position, the projections 25 of the gate 26 gather the front edge 314 of the collapsible barrier 306, and the front edge 314 and the bottom edge 316 of the collapsible barrier 306 are then raised upwardly and rearwardly until at least a portion of the front edge 314 is disposed proximate to the top edge 310 of the collapsible barrier 306. The combination retractor 320 and elongated flexible member 322 facilitate the gathering and collapsing of the collapsible barrier 306 as just described by applying a biasing force on the collapsible barrier 306 that is generally parallel with the elongated flexible member 322 and in the direction toward the retractor 320. In one specific embodiment, the opposite end of the elongated flexible member 322 is attached to the collapsible barrier 306 at a location such that the line formed by the elongated member 322 lies substantially along the arc defined by the distal end 27 of the gate 26 as it travels between its deployed and stowed positions. In this embodiment, the biasing force of the combination retractor 320 and elongated flexible member 322 is thus applied to the collapsible barrier 306 along the path through which the distal end 27 of the gate 26 directly passes, thereby facilitating the gathering of the collapsing barrier 306 between the projections 25 of the gate 26 at its distal end 27.

As the gate 26 is moved from its stowed position to its deployed position, the collapsible barrier 306 extends or spreads downwardly and forwardly so that the bottom edge 316 of the collapsible barrier 306 extends substantially horizontally from the back support 17 and the front edge 314 of the collapsible barrier 306 extends substantially vertically down from the top member 15 as illustrated in FIG. 5. In this position, the collapsible barrier 306 extends across or spans at least a portion of the vehicle exit 13 in order to impede the occupant from exiting the vehicle through that exit.

The occupant restraining capability of the collapsible barrier 306 may be strengthened or reinforced by extending one or more flexible members at least partially across the collapsible barrier. By way of example as illustrated in FIG. 5, a web 330 is inter-weaved diagonally through the collapsible barrier 306, with one end attached to the barrier mounting frame 308 adjacent to the rear support 17 and the opposite end attached to the gate 26 near its distal end 27. The web 330 lends strength to the collapsible barrier 306 in directions non-parallel with the plane defined by the barrier 306. In this regard, the present disclosure contemplates that any number of webs or other flexible members may be coupled to the collapsible barrier 306 in any manner and at any corresponding number of locations relative thereto. Examples of other flexible members include, but are not limited to, ropes, cables, belts, and the like. Any such one or more flexible members may extend between the gate 26 and the rear support 17 and/or between the gate 26 and the top member 15, to thereby add any desired amount of restraining strength to the collapsible barrier 306.

Figure 7:
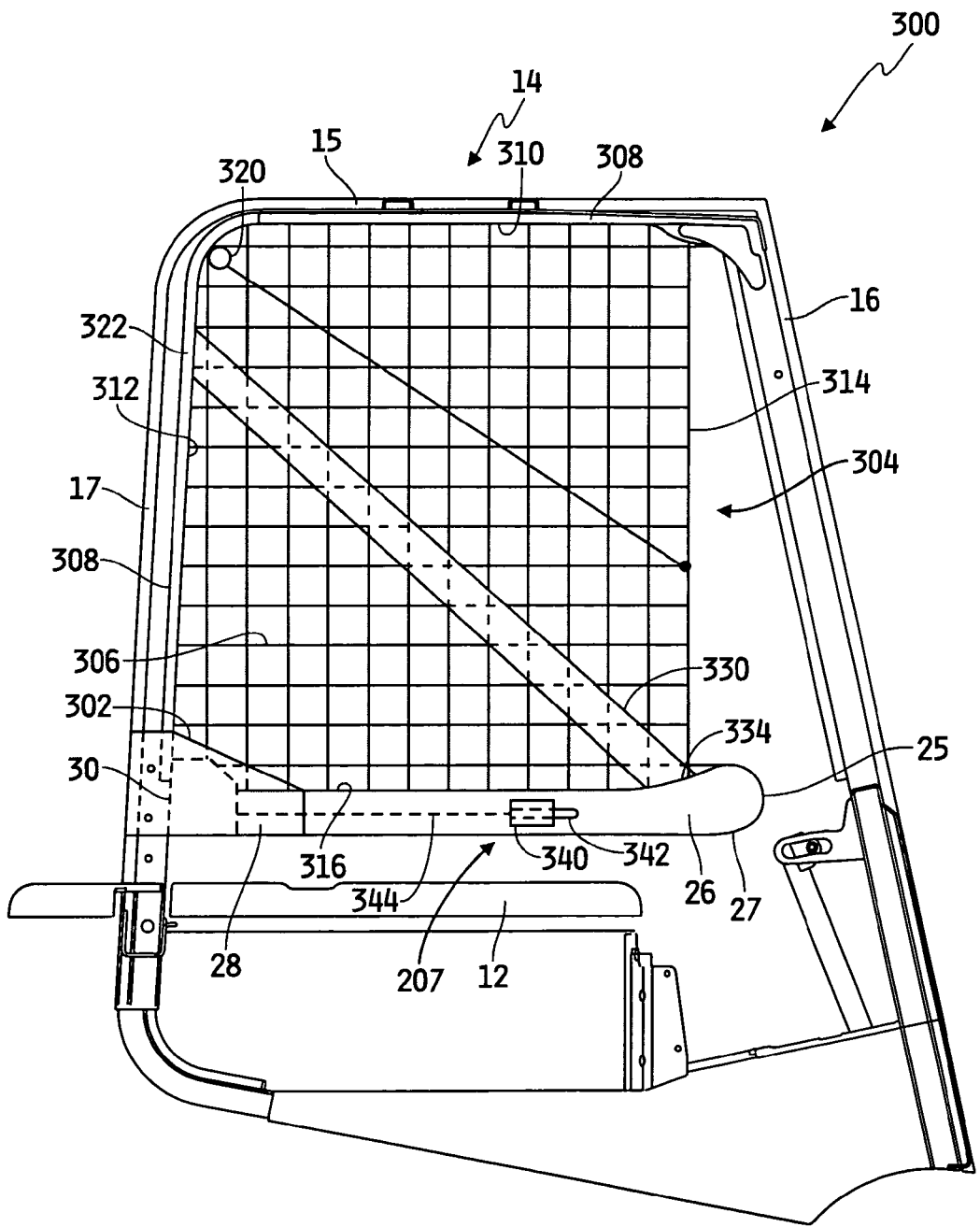
FIG. 7 shows a partial side view of the vehicle safety system of FIG. 5, as viewed through the cab area of the vehicle.

The actuator 30 in the system 300 illustratively includes a locking mechanism that locks the gate 26 both in its deployed position and in its stowed position. The locking mechanism may illustratively be provided in the form of a conventional latch (not shown) attached to the gate 26 and a latching bar or post carried by the actuator 30 (or vice versa). Alternatively, other conventional locking mechanisms may be used. In any case, a manual gate override mechanism 207 may be included, as described hereinabove, to allow the occupant of the vehicle 11 to manually move the gate 26 between its stowed and deployed positions. Referring to FIG. 7, one illustrative embodiment of such a manual gate override mechanism 207 is shown. In the illustrated embodiment, the manual gate override mechanism 207 is provided in the form of a manually activated release actuator 340 coupled to the locking mechanism associated with the actuator 30 via conventional linkage 344. The release actuator 340 may be a button, lever, or the like, and is in any case mounted to the vehicle-side surface of the gate 26 such that at least a portion of the actuator 340 extends through a channel 342 formed in the gate 26. The portion of the actuator 340 extending through the channel 342 is attached to one end of the linkage 344 having an opposite end coupled to the locking mechanism associated with the actuator 30. The actuator 340 is normally biased to one side of the channel 342. In this position, the locking mechanism associated with the actuator 30 remains locked. The actuator 340 is manually movable relative to the channel 342 along the longitudinal axis of the gate 26 to thereby draw the linkage 344 away from the actuator 30. This action causes the opposite end of the linkage 344 to unlock the locking mechanism associated with the actuator 30, thereby allowing the gate 26 to be manually movable to its stowed position. Those skilled in the art will recognize other structures and/or techniques for implementing the manual gate override mechanism 207, and any such other structures and/or techniques are contemplated by the present disclosure.

The actuator 30 is generally responsive to a control signal produced by the controller 201 to move the gate 26 between its stowed and deployed positions, and operation of the gate 26 is carried out under the control of the control system 200 as described hereinabove. Illustratively, the actuator 30 is configured to drive the gate 26 from its deployed position to its stowed position, but to allow the gate 26 to drop unimpeded by any motive force from its stowed position to its deployed position. When the manual override mechanism 207 is activated, the gate 26 is thus free-rotatable between its stowed and deployed positions.

Figure 6:
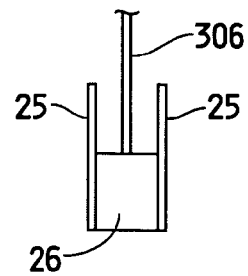
FIG. 6 illustrates an end view of the gate of the vehicle safety system of FIG. 5.

It will be understood that the system 300 illustrated and described with respect to FIGS. 5-7 may or may not include the deployable restraint 40 illustrated and described with respect to FIG. 3. Such a deployable restraint 40 may be an inflatable or non-inflatable restraint, and in either case may be resettable.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, in the embodiments described herein that include a deployable restraint in the form of an inflatable restraint 40, such an inflatable restraint may instead be replaced or augmented with a non-inflating, deployable cushion, pad or other occupant restraining and/or impact absorbing member. Such a non-inflating, deployable restraint may or may not be resettable from its deployed position to its stowed position.

What is claimed is:

1. A vehicle safety system for impeding the egress of an occupant through an exit of a vehicle, the safety system comprising:
   a gate movably coupled to the vehicle, and
   a collapsible barrier coupled to the gate and to the vehicle, the gate movable between a stowed position with the gate collapsing the collapsible barrier into a position adjacent to the vehicle such that the occupant may egress through the exit substantially unimpeded by the collapsible barrier or gate, and a deployed position with the gate and the collapsible barrier extending at least partially across the exit to impede egress of the occupant through the exit,
   wherein the gate is an elongate rigid member having a proximal end and a distal end, the proximal end of the rigid member configured to be movably coupled to the vehicle,
   and wherein the gate includes a pair of projections extending from the distal end of the gate, the projections configured to gather the collapsible barrier therebetween for movement to the stowed position.

2. The vehicle safety system of claim 1, wherein the collapsible barrier comprises a net.

3. The vehicle safety system of claim 1, wherein the collapsible barrier and the gate are configured to spread the collapsible barrier at least partially across the exit as the gate moves from the stowed position to the deployed position.

4. The vehicle safety system of claim 1, wherein the collapsible barrier and the gate are configured to collapse the collapsible barrier and move the collapsible barrier at least partially away from the exit as the gate moves from the deployed position to the stowed position.

5. The vehicle safety system of claim 1, further including means for moving the gate to the deployed position during operation of the vehicle.

6. The vehicle safety system of claim 1, further including an actuator responsive to a control signal to move the gate to the deployed position.

7. The vehicle safety system of claim 6 wherein the actuator includes a locking mechanism configured to lock the gate in the deployed position.

8. The vehicle safety system of claim 7 further including a manual release mechanism configured to unlock the gate when actuated so that the gate may thereafter be manually moved from the deployed position to the stowed position.

9. The vehicle safety system of claim 6 further comprising a control system configured to control the actuator to move the gate between the stowed and deployed positions.

10. The vehicle safety system of claim 9, wherein the control system includes a controller configured to produce the control signal based on a signal received from at least one of a switch, a parking brake, a vehicle speed sensor, an accelerometer, and a vehicle attitude sensor.

11. The vehicle safety system of claim 10 further including a manual release mechanism coupled to the gate and configured to allow free movement of the gate, when manually actuated, to a position other than the position established by the control system.

12. The vehicle safety system of claim 1, wherein the gate is configured to lock in the deployed position,
and further including means for manually unlocking the gate so that the gate may thereafter be manually moved from the deployed position to the stowed position.

13. The vehicle safety system of claim 1 further including a flexible member having a first end attached to the gate and a second end attached to the vehicle, the flexible member being coupled to the collapsible barrier and extending at least partially across the collapsible barrier when the collapsible barrier extends at least partially across the exit.

14. The vehicle safety system of claim 1 further comprising a deployable restraint mounted to the vehicle, the deployable restraint having a stowed position wherein the exit is substantially uncovered by the deployable restraint and a deployed position wherein at least a portion of the exit is covered by the deployable restraint.

15. The vehicle safety system of claim 14, wherein the deployable restraint comprises an inflatable restraint.

16. The vehicle safety system of claim 15, wherein the inflatable restraint comprises an inflatable tube.

17. The vehicle safety system of claim 15, wherein the inflatable restraint comprises an inflatable curtain.

18. The vehicle safety system of claim 15, wherein the inflatable restraint comprises an inflatable curtain and tube combination.

19. The vehicle safety system of claim 15 wherein the inflatable restraint comprises an inflatable bladder.

20. The vehicle safety system of claim 15, further comprising a housing adapted to contain the inflatable restraint in its stowed position.

21. The vehicle safety system of claim 20, wherein the housing is coupled to the gate.

22. The vehicle safety system of claim 20 wherein the housing comprises the gate.

23. The vehicle safety system of claim 15, wherein the inflatable restraint in its deployed position is inclined toward the collapsible barrier and away from the occupant of the vehicle.

24. The vehicle safety system of claim 14 wherein the deployable restraint comprises a non-inflatable member.

25. The vehicle safety system of claim 24 wherein the non-inflatable member is resettable from its deployed position to its stowed position.

26. The vehicle safety system of claim 14 further comprising a control system configured to control deployment of the deployable restraint in response to the occurrence of a predefined event.

27. The vehicle safety system of claim 26 further comprising an actuator in communication with the deployable restraint,
wherein the control system is configured to control the actuator to move the deployable restraint from its stowed position to its deployed position upon the occurrence of the predefined event.

28. The vehicle safety system of claim 27, wherein the control system comprises at least one of an accelerometer and a vehicle attitude sensor configured to detect the predefined event.

29. A vehicle safety system for impeding the egress of an occupant through an exit of a vehicle, the safety system comprising:
a gate movably coupled to the vehicle,
a collapsible barrier coupled to the gate and to the vehicle, the gate movable between a stowed position with the gate collapsing the collapsible barrier into a position adjacent to the vehicle such that the occupant may egress through the exit substantially unimpeded by the collapsible barrier or gate, and a deployed position with the gate and the collapsible barrier extending at least partially across the exit to impede egress of the occupant through the exit, and
a retractor mounted to the vehicle, the retractor having one end of an elongated flexible member attached thereto, the opposite end of the elongated flexible member attached to the collapsible barrier,
wherein the elongated flexible member retracts into the retractor as the gate moves from the deployed position to the stowed position to thereby facilitate collapsing of the collapsible barrier.

* * * * *